United States Patent [19]

Byrne

[11] Patent Number: 4,588,986

[45] Date of Patent: May 13, 1986

[54] METHOD AND APPARATUS FOR OPERATING ON COMPANDED PCM VOICE DATA

[75] Inventor: Frank Byrne, Cocoa Beach, Fla.

[73] Assignee: The United States of America as represented by the Administrator of the National Aeronautics and Space Administration, Washington, D.C.

[21] Appl. No.: 655,601

[22] Filed: Sep. 28, 1984

[51] Int. Cl.[4] .............................................. H03M 1/12
[52] U.S. Cl. .............................. 340/347 DD; 364/768; 179/18 BC
[58] Field of Search ............ 340/347 DD; 179/18 BC; 364/768

[56] References Cited

U.S. PATENT DOCUMENTS 4,230,908 10/1980 Davis et al. .................... 179/18 BC
4,357,674 11/1982 Ikeda et al. ........................... 364/768

OTHER PUBLICATIONS

Brubaker et al., "Multiplication Using Logarithms Implemented with ROM," IEEE Trans. on Computers, vol. C-24, No. 8, Aug. 75.

Primary Examiner—Bernard Roskoski
Assistant Examiner—Saul M. Bergmann
Attorney, Agent, or Firm—James O. Harrell; John R. Manning; Robert D. Marchant

[57] ABSTRACT

A method and apparatus for digitizing audio signals being generated from a plurality of parties (A, B) in order to provide audio communication between the parties with a minimum of interference. Each of the parties has an audio transmitter and receiver (38, 58) provided for transmitting and receiving audio signals. The audio signals are converted (40) to a PCM companded eight-bit parallel signal followed by conversion (42) to a serial signal for transmitting to a remote location and then reconverting (46) each of the companded serial signals to a first eight-bit parallel signal. A preprogrammed ROM (48) is located at the remote location and has a plurality of inputs and outputs. Each of the eight-bit parallel signals from the individual parties are fed to the ROM causing the ROM to produce an eight-bit signal on the output representing the instantaneous sum of the eight-bit parallel signals being supplied to the inputs thereof. The eight-bit parallel signal appearing on the output of the ROM is converted to a serial-digital signal by a parallel-to-serial converter (50) for transmitting over a single line (52) to another serial-to-parallel converter (54) prior to being fed through a digital-to-analog converter to the receiver (58) for producing the audio signal at the receiver.

8 Claims, 4 Drawing Figures

METHOD AND APPARATUS FOR OPERATING ON COMPANDED PCM VOICE DATA

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Heretofore when it was necessary to have conference calls on telephones where several parties talk to each other, this was normally accomplished through using a plurality of conventional audio signals which are fed through a summing circuit to be combined into a resulting audio signal. This resulting audio signal, in turn, was fed to the headset of a receiver. While such has been satisfactory for a limited number of parties used on the conference call, it has not been practical for large conferences which would consist of several hundred parties involved. The reason for this is the degradation of the signal to noise ratio. In order to overcome this problem, devices have been developed which utilize digital signals in transmitting conference calls.

Digitized voice data, classically 12 or 13 bits of resolution, is "companded" to 8 bits for transmission in band width limited networks. Several algorithms are commercially used to perform the "companding" function, however regardless of the exact transformation function used, the eight bit result is a floating point number—i.e. mantissa plus exponent.

To operate on such numbers, (add, subtract, multiply, divide) classically the eight bit quantity is expanded to its linear form (i.e. 12 or 13 bits) prior to the operation, and then reconverted to companded form after the operation. Both of these conversions are usually performed via "look up" techniques using ROMS (Read Only Memories) or PLA's (Programmable Logic Arrays).

SUMMARY OF THE INVENTION

The method and apparatus constructed in accordance with the present invention permits a plurality of parties to speak to each other on a conference line with a minimum of interference. Each of the parties has a headset provided with a microphone and receiver. When a party speaks into one of the microphones, the audio signal is first converted by an analog-to-digital converter to an eight-bit parallel digital signal. The eight-bit parallel digital signal is fed in parallel form to a parallel-to-serial converter which converts the signal to a serial PCM companded wave train. This serial PCM wave train is then transmitted to a remote location over a single wire. Upon receiving the serial PCM signal, it is first fed to a serial-to-parallel converter which converts the signal back to an eight-bit data parallel signal. The eight-bit parallel signal is fed to one input of a pre-programmed ROM. This eight-bit signal provides one-half of a sixteen-bit address for a lookup ROM. The other half of the sixteen-bit ROM address is supplied by another subscriber over an identical circuit as described above. If it is desired to add more subscribers, then you would make the address wider or perform a plurality of sequential lookups. The output of the ROM is an eight-bit companded parallel signal that is, in turn, fed to a parallel-to-serial converter for being converted back to a serial PCM signal to be transmitted over a line to a second serial-to-parallel converter. The second serial-to-parallel converter converts the signal back to an eight-bit parallel signal and is fed to a digital-to-analog converter which signal, in turn, is fed to a receiver to reproduce the audio signal.

Prior to operating the system, the ROM is pre-programmed to contain all possible combinations of results as defined by the two eight-bit input quantities from the A and B subscribers. It is to be understood, of course, that when more than two subscribers are used, the ROM is pre-programmed to handle all possible combinations. For two subscribers, there are two to sixteenth power possible combinations prestored in the ROM for handling all possible combinations of the two eight-bit signals coming in from the A and B subscribers. A similar circuit is used for transmitting the conversation back from the ultimate receiver to the parties tied in on the lines.

In order to minimize the amount of storage required in the ROM, a simplified circuit has been designed for receiving the inputs from the subscribers A and B. These two inputs are fed to a sign ROM, a sum ROM and a delta ROM. The sign ROM has been pre-programmed to determine the output sign and whether the remainder of the output data is derived from the sum ROM or the delta ROM. In other words, the sign ROM is only saying whether the information should be taken from the sum ROM or a delta ROM and produces a sign output indicating the sign of the eight bit signal.

The sign ROM is also used for enabling the sum ROM and the delta ROM so as to produce a seven-bit output from the appropriate ROM. The use of the sum ROM and the delta ROM eliminates the redundancy of the stored data in the ROM and, therefore, reduces the storage requirement.

In still another modified form of the invention, a multiplier ROM can be inserted in the circuit between the first serial-to-parallel converter and the ROM for multiplying the signal to provide volume control for the circuit.

Accordingly, an important object of the present invention is to provide a method and apparatus for operating on companded PCM voice data to transmit audio signals between a plurality of parties on a conference call with a minimum of interference.

Another important object of the present invention is to provide a circuit for transmitting high quality audio signals over long distances and be able to switch and distribute them through complicated networks without degrading the quality thereof.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

DESCRIPTION OF THE PRIOR ART AND THE PREFERRED EMBODIMENT

Figure 1:
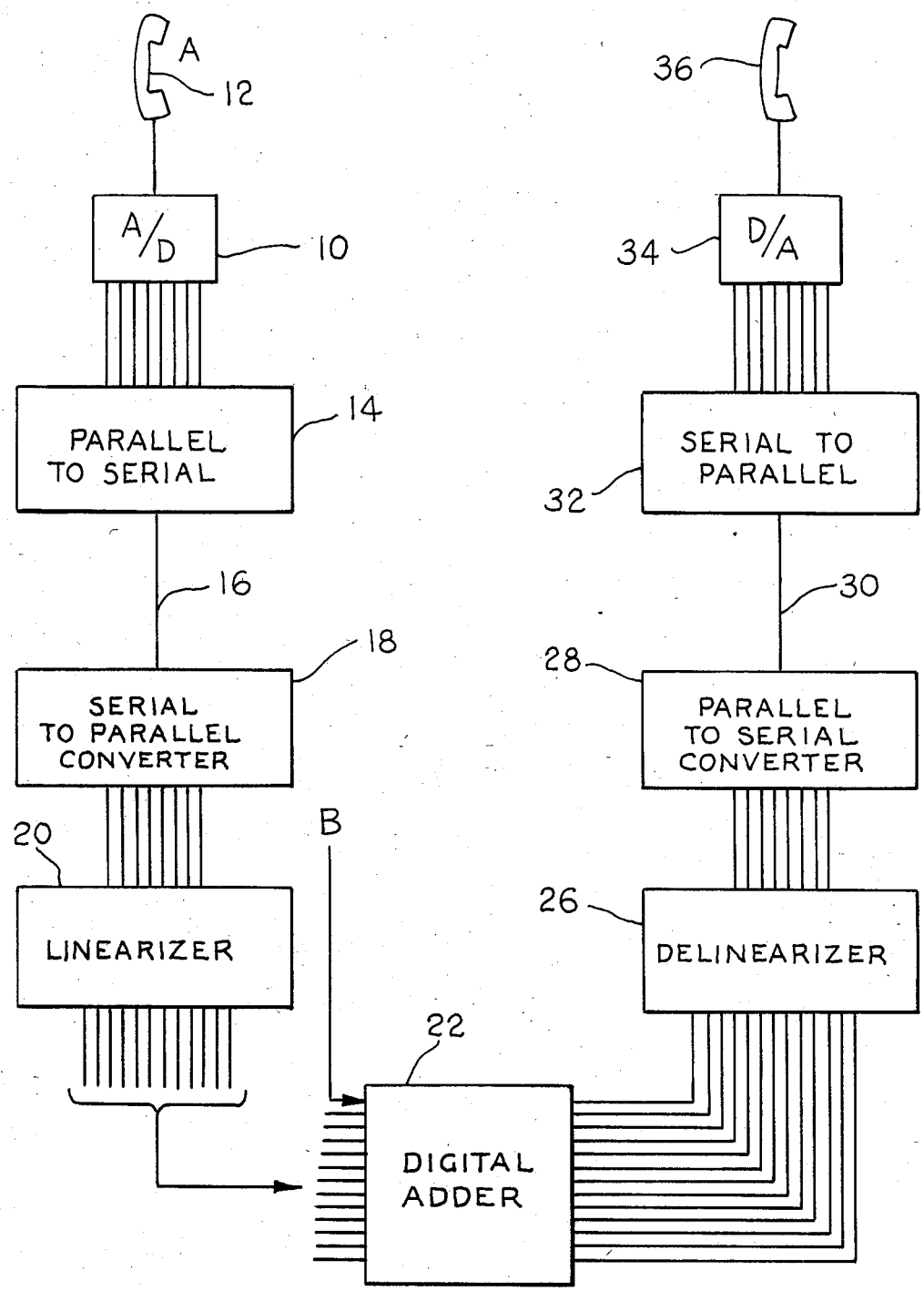
FIG. 1 is a schematic diagram illustrating a system for handling companded PCM voice data constructed in accordance with the prior art.

In FIG. 1, there is a circuit showing the conventional prior art system utilized for handling conference calls. In FIG. 1, an analog-to-digital converter 10 is connected to the transmitting portion or the mike of a telephone 12 for converting the voice signals to an eight-bit parallel digital signal. These parallel digital signals are, in turn, converted by a parallel-to-serial converter 14 for being transmitted long distances over a single line 16. It is not practical to transmit the signals in parallel form over long distances. The serial PCM signal transmitted over the line 16 is then converted back to an eight-bit parallel companded signal by a serial-to-parallel converter 18. This eight-bit companded digital signal is fed to a linearizer 20 which converts the eight-bit companded signal to a twelve-bit linear digital data signal. The reason for this is that you cannot add a floating point number to another floating point number in conventional adders.

The twelve-bit linear digital signal is then fed into one input of a digital adder 22 to be added with a similar twelve-bit linear digital data signal coming from another headset B. It is to be understood that any number of headsets can be fed into the digital adder. The digital adder performs a mathematical adding process and produces a thirteen-bit sum on the output terminals 24 in parallel form. This thirteen-bit sum is then fed to a delinearizer 26 which converts the signal back to an eight-bit companded digital data signal in parallel form that is fed to a parallel-to-serial converter 28. The parallel-to-serial converter 28 converts the eight-bit companded data signal back to a serial PCM signal for transmission over a long line 30 to another serial-to-parallel converter 32. The serial-to-parallel converter 32 feeds the parallel data to a digital-to-analog converter 34 associated with the receiver portion of a headset 36. Such is the conventional way of transmitting conference calls.

Figure 2:
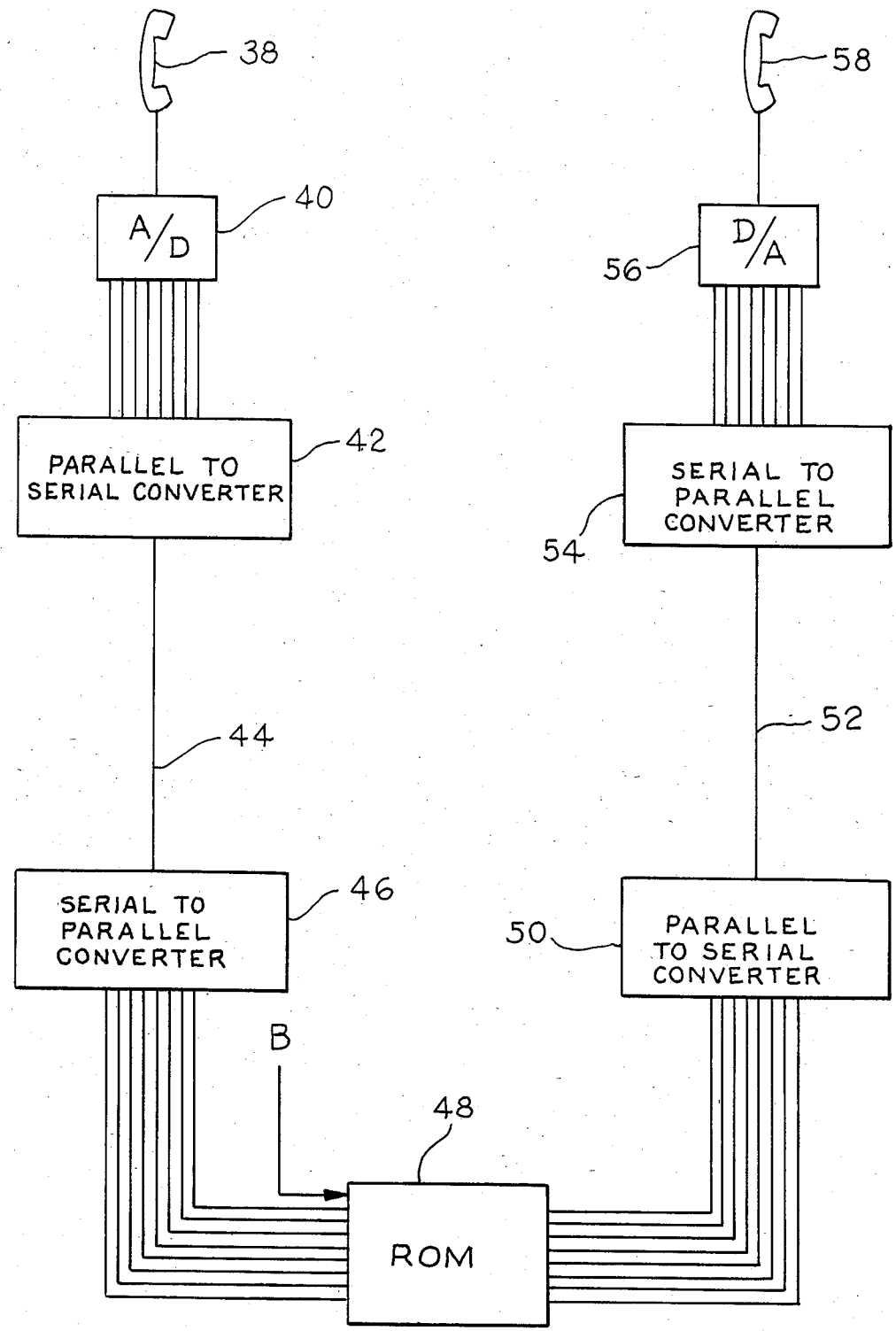
FIG. 2 is a schematic diagram illustrating a circuit constructed in accordance with the present invention

In order to minimize the number of processes that are necessary in the above described system, that is, eliminate the linearizer 20, the digital adder 22, the delinearizer 26, and the equivalent processors included in the other circuits being fed to the digital adder, a circuit constructed in accordance with the present invention (as shown in FIG. 2) has been developed. In the circuit of FIG. 2, which conforms to the invention, the audio signal from the headset 38 is fed directly to an analog-to-digital converter 40 which converts the signal to an eight-bit parallel digital signal. The eight-bit parallel digital signal is fed in parallel form to a parallel-to-serial converter 42 which converts the signal to a serial PCM companded wave train. This serial PCM wave train is capable of being transmitted over long distances over a signal wire 44. Upon receiving the serial PCM signal, it is first fed to a serial-to-parallel converter 46 which converts the signal back to an eight-bit parallel data signal. The eight-bit parallel signal is fed to one input of a ROM 48. This eight-bit signal provides one-half of a sixteen-bit address for a lookup ROM 48. The other half of the sixteen-bit address is supplied by another subscriber as identified by B. If it is desirable to add more subscribers, then you would merely make multiple lookup steps or make the address wider. The output of the ROM 48 is an eight-bit companded parallel signal that is, in turn, fed to a second parallel-to-serial converter 50 for being converted back to a serial PCM signal to be transmitted over a line 52 to another serial-to-parallel converter 54. The serial-to-parallel converter 54 converts the signal back to an eight-bit parallel signal that is fed to a digital-to-analog converter 56 and is, in turn, fed to a receiver 58.

Prior to operating the system, the ROM 48 is pre-programmed to contain all possible combinations of results as defined by the two eight-bit input quantities from the A and B subscribers. That is, the ROM 48 is programmed to represent on its output the instantaneous sum of the two digital input quantities. These two digital input quantities represent an audio sample of the signals produced by both the B subscriber. It is to be understood, of course, that in order to reproduce a word, it is necessary to make an extremely large number of samplings for each word. There are two to the sixteenth power possible combinations prestored in the ROM 48 for handling all possible combinations of the two eight-bit signals coming in from the A and B subscribers. As can be seen, storage for two to the sixteenth power sums is a large amount of storage and in normal shortcuts are taken so as to minimize the amount of storage required for the ROM.

Figure 3:
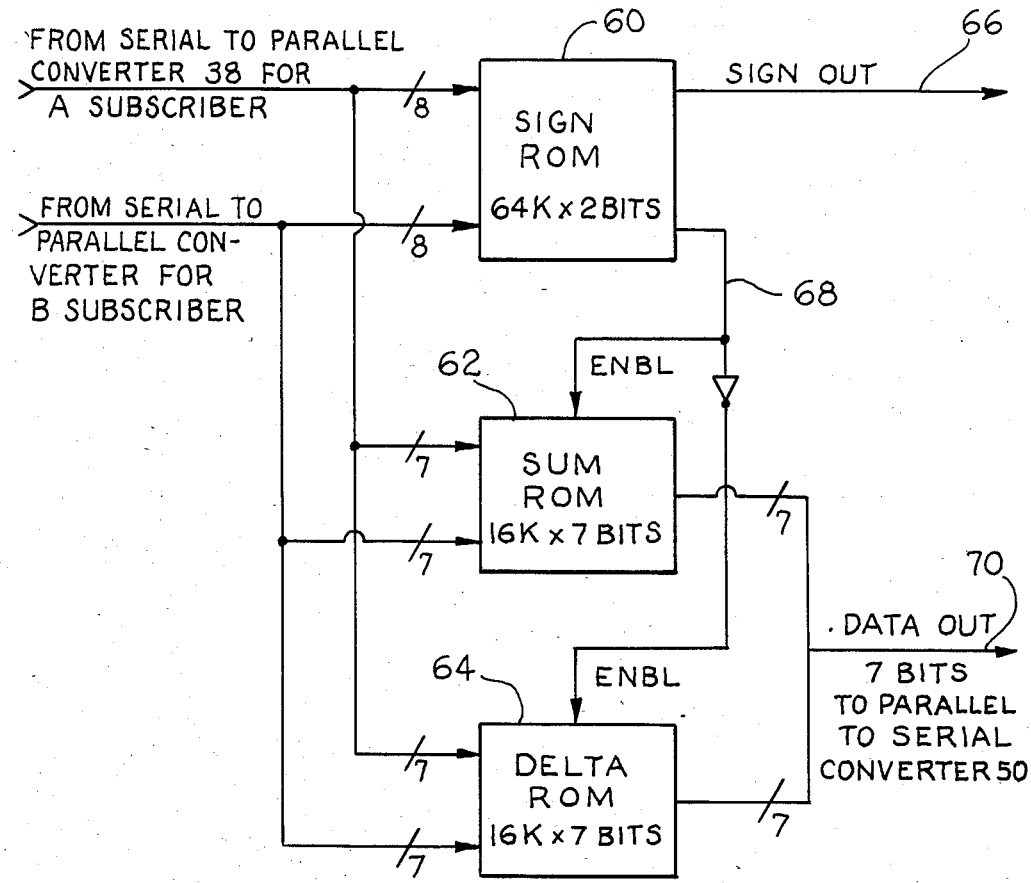
FIG. 3 is a schematic diagram illustrating a circuit that can be used in place of the ROM of FIG. 2 for minimizing the stored data required for the ROM of FIG. 2.

One particular simplified circuit is shown in FIG. 3. As shown in FIG. 3, there are two inputs from subscribers A and B. These two inputs are fed to a sign ROM 60, a sum ROM 62, and a delta ROM 64. The sign ROM 60 is a 64K times 2-bit ROM which has been programmed to the output sign and whether the remainder of the output data is derived from the sum ROM 62 or the delta ROM 64. In other words, the sign ROM 60 is only saying whether the information should be taken from the sum ROM 62 or the Delta ROM 64 and produces a sign output on lead 66 indicating the sign of the eight-bit signal.

Upon either the sum ROM 62 or delta ROM 64 being enabled by the signal coming in over lead 68, either the sum ROM 62 or delta ROM 64 will output seven bits of resulting data onto the output line 70. The use of the sum ROM 62 and the delta ROM 64 eliminates the redundancy of the stored data and, therefore, reduces the storage requirement. This is accomplished by connecting an output lead 68 from the sign ROM 60 to an enable input of both a sum ROM 62 and a delta ROM 64. The sum ROM 62 has the sum programs stored therein for summing all positive and all negative inputs, i.e., all inputs of like sign, whereas the delta ROM has all the differences stored therein, i.e., inputs where the signs differ. The incoming data from the serial-to-parallel converter 38 produced by the A and B subscribers determines what location is being read from and the respective ROM 62 and 64.

Figure 4:
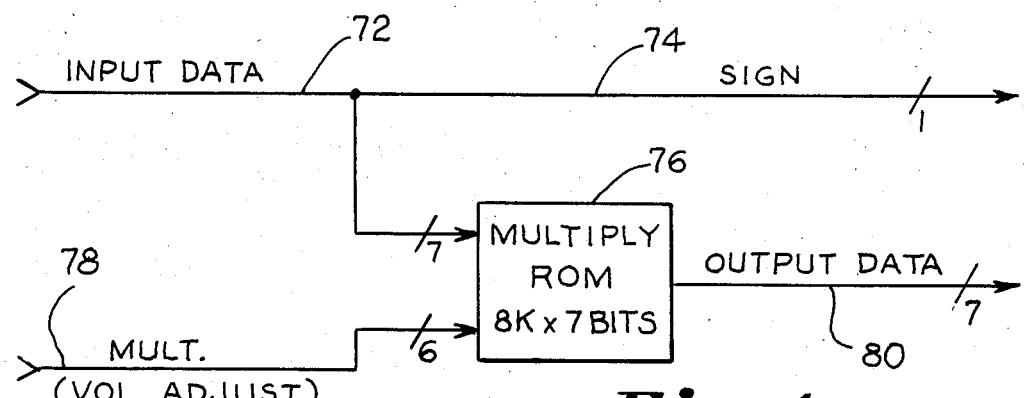
FIG. 4 is a schematic diagram of a typical ROM multiplier that can be inserted in the circuit of FIG. 2 for controlling the volume level of the signals.

The circuit of FIG. 4 can be inserted in the system for controlling the volume level. This circuit includes a multiplier ROM that is connected between the serial-to-parallel converter 46 and the ROM memory 48 for multiplying the signal for providing a volume control for the circuit. Again, we have eight-bits of parallel companded input data on line 72 from the serial-to-parallel converter 46 which includes the sign that is passed straight through to line 74 and is not operated on at all. The remaining seven data bits are applied to ROM 76 as part of a thirteen-bit address. The other six bits of address are derived from a multiplier constant input lead 78 and determines the multiplication constant that will be applied to the output data which appears on line 80. The output line 80 is, in turn, fed directly into the ROM 48. This enables the amplitude of the different subscribers to be varied. Often this is necessary where one subscriber is, for example, located at a substantial distance whereas the other subscriber is on-site causing a difference in amplitude. What this circuit is doing is compensating for difference in amplitude of the signals of the two subscribers.

It will be understood, or course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

I claim:
1. A method of digitizing audio signals being generated from a plurality of parties in order to provide audio communication between the parties with a minimum of interference comprising:
   converting said audio signals produced by said parties from an analog signal to parallel digital signals;
   converting said parallel digital signals to first serial PCM companded wave trains;
   transmitting each of said first serial PCM companded wave trains over a single wire to a remote location;
   converting each of said first serial PCM companded wave trains back to second parallel digital signals;
   feeding each said second parallel digital signals to a preprogrammed ROM producing on its output terminals a third eight-bit companded parallel signal;
   feeding each said third eight-bit companded parallel signal to a parallel-to-serial converter for being converted to a second serial PCM signal;
   transmitting said second serial PCM signal over a line to another serial-to-parallel converter and digital-to-analog converter producing a reproduced analog signal; and
   feeding said reproduced analog signal to a receiver which reproduces an audio signal from said reproduces analog signal.

2. The method as set forth in claim 1 further comprising:
   each of said PCM companded wave trains being converted back to parallel digital signals being eight-bit parallel digital signals; and
   said eight-bit companded parallel signal being produced by said ROM being the instantaneous sum of the eight-bit parallel digital signals being supplied thereto.

3. The method as set forth in claim 1 further comprising:
   said parallel digital signals, which are produced by converting said audio signals of said parties, being eight-bit parallel digitial signals.

4. An apparatus for transmitting and reproducing audio signals between a plurality of parties with a minimum of interference comprising:
   an audio transmitter and receiver provided for each of said parties for transmittig and receiving first audio signal;
   means for converting each of said first audio signals to a PCM companded signal for transmitting to a remote location and then converting each of said companded signals to a first eight-bit parallel signal;
   a preprogrammed ROM located at said remote location having a plurality of inputs and outputs;
   means for supplying each of said first eight-bit parallel signals to said ROM causing said ROM to produce a second eight-bit signal on its output representing the instantaneous sum of said first eight-bit parallel signals being supplied to the inputs of said ROM;
   means for converting and transmitting said second eight-bit parallel signal produced on the output of said ROM to an analog signal, and
   a receiver receiving said analog signal and producing a second audio signal therefrom.

5. The apparatus as set forth in claim 4 further comprising:
   said means for converting each of said first audio signals to a PCM companded signal for transmitting to a remote location and then converting each of said companded signals to a first eight-bit parallel signal including,
   (i) an analog-to-digital converter converting said audio signal to a third eight-bit parallel signal;
   (ii) a first parallel-to-serial converter converting said third eight-bit parallel signal to said PCM companded signal, and
   (iii) a first serial-to-parallel converter converting said PCM companded signal to said first eight-bit parallel signal.

6. The apparatus as set forth in claim 4 further comprising:
   said means for converting and transmitting said second eight-bit parallel signals produced on the output of said ROM to an analog signal including,
   (i) a second parallel-to-serial converter converting said second eight-bit parallel signals to a serial digital signal,
   (ii) a second serial-to-parallel converter;
   (iii) a transmission line connected between said second parallel-to-serial converter and said second serial-to-parallel converter, and
   (iv) a digital-to-analog converter connected to an output of said second serial-to-parallel converter.

7. The apparatus as set forth in claim 5 further comprising:
   a ROM multiplier means provided for receiving said first eight-bit parallel signal from said serial-to-parallel converter and multiplying said signal prior to feeding said signal to said ROM for providing a volume control for said circuit.

8. The apparatus as set forth in claim 4 further comprising:
   said preprogrammed ROM including;
   (i) a sign ROM, a sum ROM and a delta ROM;
   (ii) said sign ROM having at least a pair of inputs each of which is connected for receiving said first eight-bit parallel signals and generating a sign output signal on a sign output terminal, and a sum or delta signal on another output terminal;
   (iii) means for supplying said sum or delta signals to said sum ROM or said delta ROM for enabling either said sum ROM or said delta ROM, and
   (iv) means for supplying said first eight-bit parallel signals to said sum ROM and said delta ROM for reading out signals stored therein depending on whether said sum ROM or delta ROM is enabled.

* * * * *